No. 664,021. Patented Dec. 18, 1900.
R. KOPP.
BUTTER CUTTING APPARATUS.
(Application filed Apr. 10, 1900.)
(No Model.) 2 Sheets—Sheet 1.
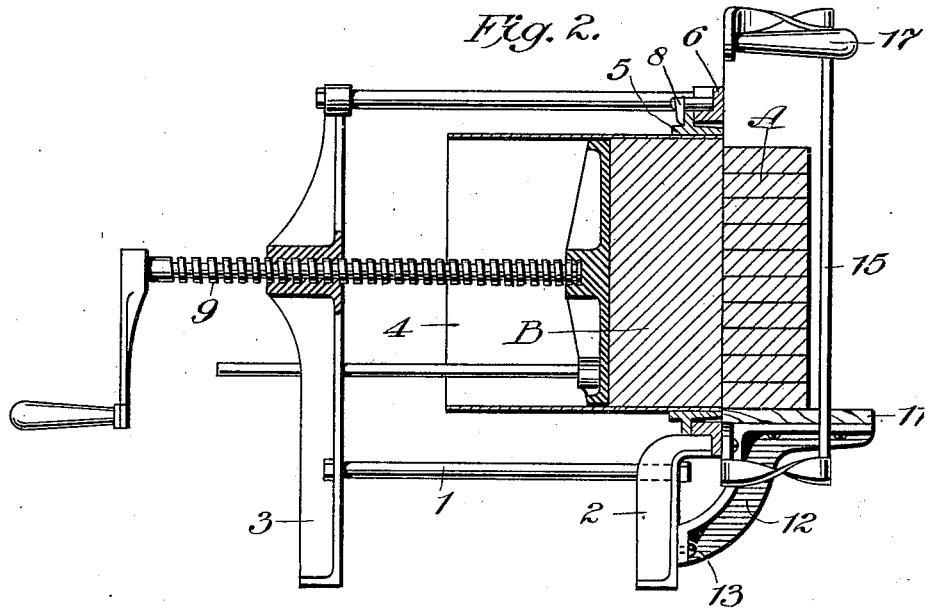
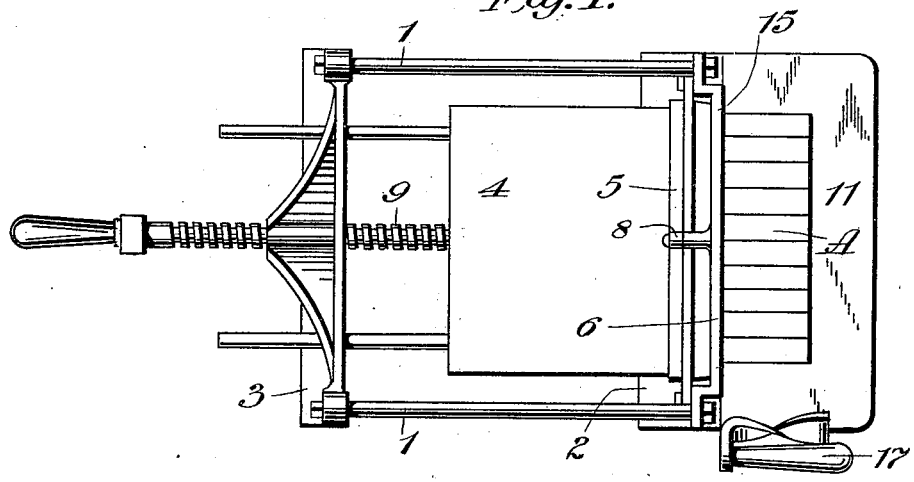
WITNESSES:
George T. Hackley
L. Vreeland
INVENTOR
Robert Kopp.
BY
ATTORNEY
THE NORRIS PETERS CO., PHOTO-LITHO., WASHINGTON, D. C.

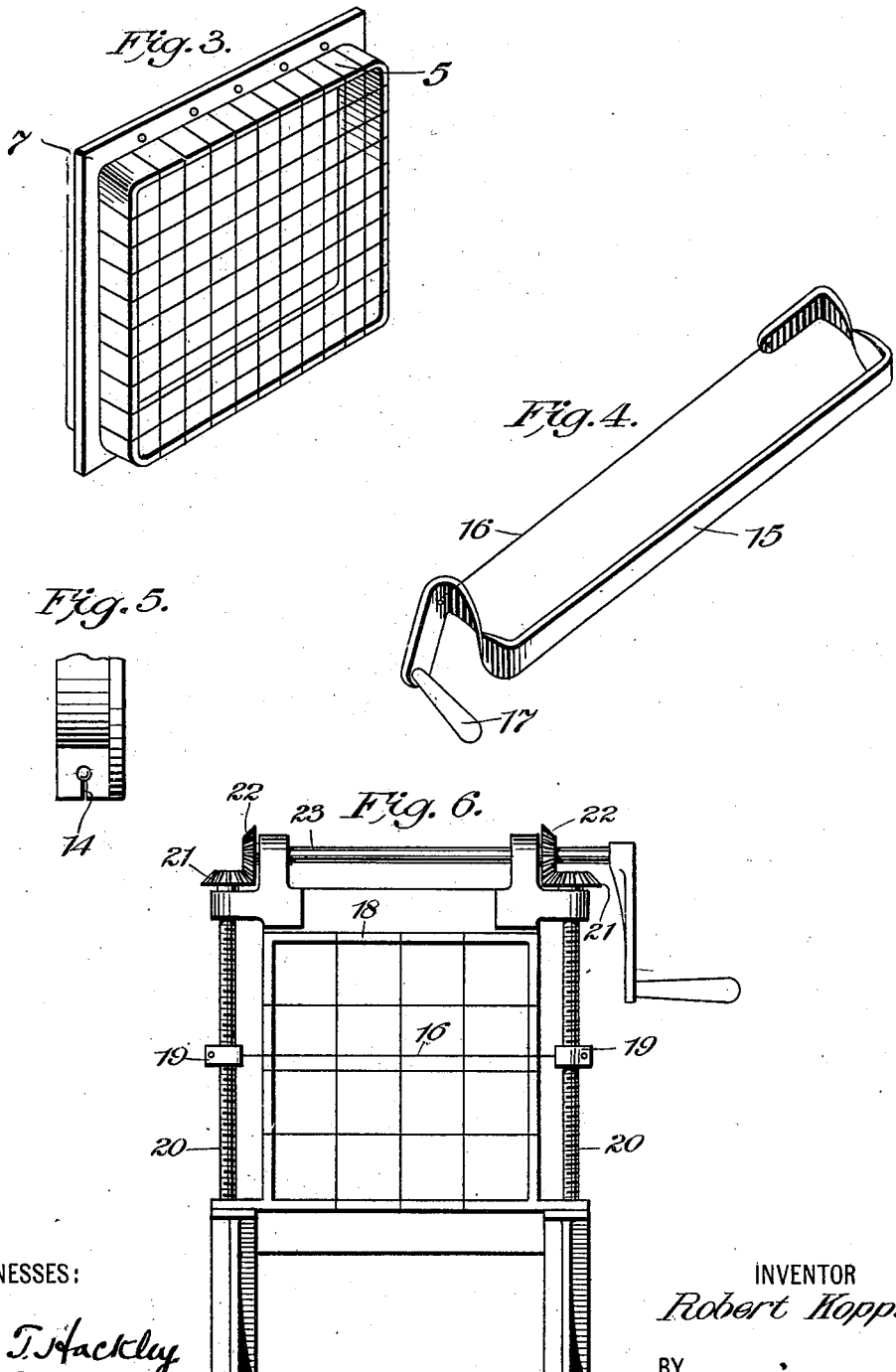

UNITED STATES PATENT OFFICE.

ROBERT KOPP, OF NEW YORK, N. Y.

BUTTER-CUTTING APPARATUS.

SPECIFICATION forming part of Letters Patent No. 664,021, dated December 18, 1900.

Application filed April 10, 1900. Serial No. 12,321. (No model.)

*To all whom it may concern:*

Be it known that I, ROBERT KOPP, a citizen of the United States, residing at New York city, New York, have invented certain new and useful Improvements in Butter-Cutting Apparatus, of which the following is a full, clear, and exact description.

My invention relates to improvements in devices for cutting butter and the like; and my object is to provide a device which will cut a mass, such as a tub or box, of butter into smaller cakes or pats with rapidity and regularity.

In the preferred embodiment of my invention shown in the drawings, Figure 1 represents a plan view of my device. Fig. 2 is a central sectional view of the same. Fig. 3 is a detail view of the removable head carrying the crossed wires. Fig. 4 is a detail of the wire cutter. Fig. 5 is a detail of the lower end of the leg upholding the support. Fig. 6 is a front elevation of a modification.

In the above preferred embodiment, 1 represents generally the frame of the machine, which includes the end supports 2 and 3 and suitable connecting-rods. I call this frame a "hollow" frame. In the present embodiment the rods *l* and the end supports inclose a space in which the butter may be inserted and moved and in which the hollow head 5 may move forward to its place, as will be hereinafter described.

4 is a receptacle for the butter, which may be the tub or cask or box which holds the butter with the bottom and top removed.

5 is a head, across which are stretched cutting devices, preferably wires, to cut the butter in one direction into portions of the desired size, and this head is removable from the frame. As shown in Fig. 2, the front end of the frame is provided with a support 6, into which the head fits and against which the flange 7 around the head rests. The part 6 thus forms an abutment for the head.

8 is a latching mechanism pivoted to the frame, which may lock the removable head in position.

9 is a screw-threaded follower for pushing the mass B of butter forward—that is, toward the cross-wires.

11 is a support, in this embodiment a shelf, to receive the butter-pats after they have been severed and in this embodiment stands beneath the path of movement of the butter and is provided with a pair of legs 12.

13 is one of a pair of pins on the frame which enter slots 14, Fig. 5, in the lower end of the legs 12.

15 is a U-shaped cutter-support, which cutter is in this embodiment a wire 16, Fig. 4. This cutter is pivoted to the frame on the side of the head opposite from the mass of butter.

The butter may either be placed in the receptacle 4 or a tub of butter may be put in position as shown, and when the follower is screwed up the butter will be forced through the cross-wires of the head and will thus be cut in one direction by said wires. When the butter has been forced forward far enough so that the portions A, Fig. 2, of the butter, which have been thus cut in one direction by the cross-wires, attain the thickness desired, the handle 17 may be grasped and the cutter rotated on its pivot, which will cause the wire 16 to pass close against the head 5, and thus sever the cut portions from the mass of butter remaining in the receptacle 4. The butter can thus be cut quickly and rapidly into pats of the desired size. The removability of the head allows different heads to be substituted. In this way different shapes and sizes of pats may be easily produced.

In Fig. 6 I have shown a modified form of my device, the part 18 being the head and the wire 16 being carried between two screw-threaded supports 19 19, which engage screw-shafts 20 20, carrying at the upper portion thereof beveled gears 21 21, which are in turn engaged by beveled gears 22 22 on the shaft 23.

I am aware that very many changes may be made in the construction herein shown and described without departing from the spirit of my invention, and I therefore do not desire to limit myself to the particular embodiment herein disclosed or to the particular substance acted upon.

What I claim is—

1. In a cutter for merchandise in combination, a hollow frame to support the material to be cut having an opening in the forward part thereof, means to push the material forward through said opening, a hollow head relatively proportioned whereby said head may be inserted in said opening from the rear thereof and having an outwardly-extending stop to hold said head in place and prevent its moving forward, and cutters running across the interior of said hollow head to cut said material as the same is pushed forward, and a movable cutter located forward of said head to cut said material in a transverse direction.

2. In a cutter for merchandise in combination, a hollow frame to support the material to be cut having an opening in the forward part thereof and a hollow head, said frame having an opening of such a size as to allow said head to be passed down into said frame and inserted in said opening from the rear thereof, said head having a stop adapted to abut against the forward part of said frame whereby the same is held in place, and crossed wires stretched across said head, means to push said material forward through said head and opening whereby the same is cut longitudinally by said wires, and a cutter located forward of said frame and head to cut said material transversely.

ROBERT KOPP.

Witnesses:
L. VREELAND,
H. M. SKINNER.